_United States Patent Office_  
3,403,127  
Patented Sept. 24, 1968

3,403,127  
CURING OF FLUORO-RUBBERS WITH QUATERNARY AMMONIUM SALTS  
William Flavell and Angel Nodar-Blanco, Chessington, England, assignors to Yarsley Research Laboratories Limited, Surrey, England, a British company  
No Drawing. Filed Jan. 3, 1966, Ser. No. 517,989  
Claims priority, application Great Britain, June 2, 1965, 23,507/65  
9 Claims. (Cl. 260—41)

ABSTRACT OF THE DISCLOSURE

The present invention provides for a process of curing fluoro-rubber compositions by heating a composition comprising a copolymer of vinylidene fluoride, carbon black and other fillers and a nitrogenous curing agent, the improvement which consists in the use of a trialkyl quaternary ammonium salt in an amount of from 1% to 4% by weight of the vinylidene fluoride copolymer as the curing agent.

---

This invention relates to an improved method for the curing of fluoro-rubber and to new curing agents therefor.

The term "fluoro rubbers" in this specification designates copolymers of vinylidene fluoride and hexafluoropropene, and terpolymers of vinylidene fluoride, hexafluoropropene and tetrafluoroethylene, being exemplified by the materials known commercially as "Viton A" and "Viton B" (the word "Viton" is a registered trademark).

Numerous curing agents have been proposed for the curing of these fluoro-rubbers in the past and, among those agents, hexamethylene diamine derivatives have been the most successful to date. Examples of such derivatives are hexamethylene diamine dicarbamate and dicinnamylidene hexamethylene diamine. It is an object of the present invention to provide an improved method of curing fluoro-rubbers which makes possible the production of improved cured products and, in many cases, permits the curing times to be shortened. The method involves the use of a new type of curing agent, and also makes possible planned variation and adjustment of the properties of the cured materials by suitable variations in the curing procedure and conditions.

The improved curing method consists, essentially, in the compounding of the fluoro-rubber with a trialkyl quaternary ammonium salt in an amount of from 1% to 4% by weight thereof, the composition also incorporating the usual ingredients, e.g. carbon black and metallic oxides) well known in the rubber industry, and heating the composition to effect curing thereof.

The trialkyl quaternary ammonium salts at present preferred for use in the method of the invention are the bifunctional quaternary ammonium salts of the general formula $[R_3N-R^1-NR_3]^{++}2X^-$ where $X^-$ represents a monovalent anion (e.g. halide, alkoxide or phenoxide). Each R represents an alkyl radical and $R^1$ represents a bifunctional alkylene, or phenylene dialkylene radical.

The invention also includes the use of monofunctional trialkyl quaternary ammonium salts of the general formula $[R^{11}N-R_3]^+X^-$ where $X^-$ represents a monovalent anion (e.g. halide, alkoxide or phenoxide), $R^{11}$ represents a monofunctional alkyl or aralkyl radical and R represents an alkyl radical.

Examples of the bifunctional trialkyl quaternary ammonium salts suitable for use in accordance with the method of the invention are:

(1,4-phenylene dimethylene) bis (trimethyl ammonium chloride)

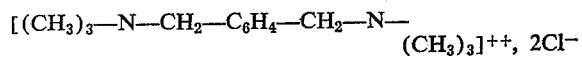

(1,4-phenylene dimethylene) bis (triethyl ammonium chloride)

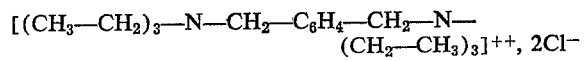

(1,4-phenylene dimethylene) bis (tributyl ammonium chloride)

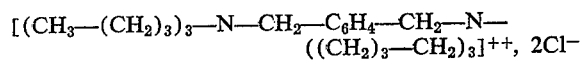

(1,4-phenylene dimethylene) bis (dimethyl dodecyl ammonium chloride)

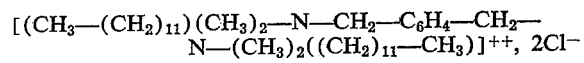

(1,4-phenylene dimethylene) bis (trimethyl ammonium bromide)

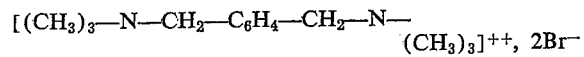

(1,4-phenylene dimethylene) bis (tri-ethyl ammonium bromide)

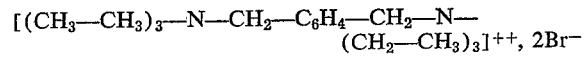

(1,3-trimethylene) bis (tributyl ammonium bromide)

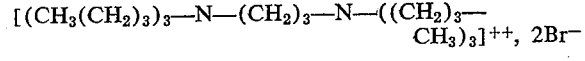

(1,4-phenylene dimethylene) bis (trimethyl ammonium phenoxide)

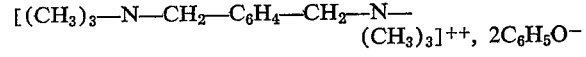

(1,4-phenylene dimethylene) bis (triethyl ammonium pentachloro-phenoxide)

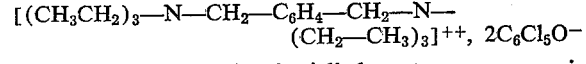

Suitable monofunctional trialkyl quaternary ammonium salts are exemplified by the following:

trimethyl benzyl ammonium chloride

triethyl benzyl ammonium chloride

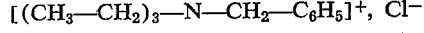

dimethyl dodecyl benzyl ammonium chloride

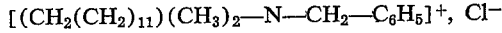

triethyl benzyl ammonium bromide

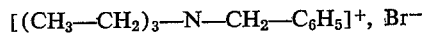

The improved curing method of the invention allows for the adjustment of the curing procedures to vary within wide limits the properties of the cured fluoro-rubber compound. Thus, the curing procedure may be so adjusted as to give cured compounds with particularly good tensile strength, high elongation at break, high modulus, and resistance to compression set at elevated temperatures.

The curing temperatures employed are ordinarily in the range of 150° C. up to 200°–210° C. and it is frequently convenient to effect an initial cure in a mould at 150° C. to 170° C. whereafter the moulded article is sufficiently form-stable to be readily transferable to an oven in which it can be more fully cured by heating at the higher temperatures. The cured article may, if desired, be given a post-cure heat treatment at temperatures up to 250° C.

The properties so obtained are better than those obtained hitherto with conventional curing compounds such as, for example, dicinnamylidene hexamethylene diamine.

It is another important advantage of the method of the invention that the cure times necessary for the attainment of a particular pre-determined combination of properties may be made considerably shorter than those required with the conventional curing agents, the final properties being similar to, or better than those of fluororubbers cured in the conventional way. Thus, for example, "Viton A" may be cured with (1,4-phenylene dimethylene) bis (triethyl ammonium chloride) in a time as short as seven to eight hours (compared with the time of cure of twenty-four hours necessary with dicinnamylidene hexamethylene diamine—a conventional amine curing compound widely used hitherto).

The manner in which the invention may be carried into effect is illustrated by the following examples in which the parts referred to are parts by weight; it is to be understood that the examples are, however, not limitative in any way:

Example 1

100 parts of a copolymer of vinylidene fluoride (4 moles) and hexafluoropropene (1 mole) (sold under the trademark "Viton A"), 20 parts of carbon black, 15 parts of magnesium oxide and varying proportions of a mixture of equal parts by weight of calcium oxide and (1,4-phenylene dimethylene) bis (triethyl ammonium chloride) were blended together on a 2-roll mill.

The components were compounded as shown below and vulcanised in a mould for 45 minutes at 160°–170° C. followed by an oven cure comprising a gradual rise from 100° to 205° C. (25° C. per hour) followed by 16 hours at 205° C.

The properties of the cured fluoroelastomers are shown in the table.

| | (a) | (b) | (c) | (d) | (e) |
|---|---|---|---|---|---|
| Components, parts by weight: | | | | | |
| Vinylidene fluoride/hexafluoropropene copolymer ("Viton A") | 100 | 100 | 100 | 100 | 100 |
| MT carbon black | 20 | 20 | 20 | 20 | 20 |
| Magnesium oxide | 15 | 15 | 15 | 15 | 15 |
| Dicinnamylidene hexamethylene diamine | 3 | | | | |
| Calcium oxide (1 part) (1,4-phenylene dimethylene) bis (triethylammonium) chloride (1 part) | | 2 | 4 | 6 | 8 |
| Physical properties after press cure and oven cure: | | | | | |
| Ultimate tensile strength (p.s.i.) | 2,320 | 2,375 | 2,300 | 1,880 | 1,870 |
| Modulus at 100% elongation (p.s.i.) | 800 | 460 | 1,090 | 1,660 | |
| Elongation at break, percent | 190 | 330 | 180 | 130 | 110 |
| Hardness | 75 | 62 | 65 | 70 | |
| Weight loss during cure, percent | 1.9 | 1.1 | | | |
| Shrinkage, percent: | | | | | |
| In press cure | 2.5 | 2.2 | | | |
| In oven cure | 1.7 | 1.3 | | | |
| Total shrinkage | 4.2 | 3.5 | | | |
| Resistance to compression set: | | | | | |
| 24 hours under compression at 160° C. | 20.3 | | 9 | | |
| 24 hours under compression at 250° C. | 97 | | 45 | | |
| Physical properties after ageing 24 hours at 250° C.: | | | | | |
| Ultimate tensile strength | 2,300 | 2,500 | | | |
| Modulus at 100% elongation | | 650 | | | |
| Elongation at break, percent | 150 | 280 | | | |
| Resistance to compression set: | | | | | |
| 24 hours under compression at 160° C. | 7.5 | | 3.6 | | |
| 72 hours under compression at 160° C. | 20 | | 14 | | |
| 500 hours under compression at 160° C. | 50 | | 42 | | |

The composition (a) in the above table represents the prior art and the data thereon is given for comparison with the compositions (b), (c), (d) and (e) which are in accordance with the present invention.

Example 2

100 parts of the vinylidene fluoride/hexafluoropropene copolymer used in Example 1, 20 parts of carbon black, 15 parts of magnesium oxide and 2 parts of a mixture of equal parts by weight of calcium oxide and (1,4-phenylenedimethylene) bis (triethyl ammonium chloride) were blended together and vulcanised in a mould for 45 minutes at 160°–170° C., followed by heating in an air oven at 205° C. for 7 hours.

The properties of the vulcanised rubber were as follows:

Physical properties after press-cure only—

Ultimate tensile strength (p.s.i.) _____ 2280
Modulus at 100% elongation (p.s.i.) _____ 300
Elongation at break, percent _____ 540

Physical properties after press-cure and oven cure

Ultimate tensile strength (p.s.i.) _____ 2750
Modulus at 100% elongation (p.s.i.) _____ 470
Elongation at break, percent _____ 320
Resistance to compression set 24 hours under compression at 160° C. _____ 29

Example 3

100 parts of the vinylidene fluoride/hexafluoropropene copolymer used in Example 1, 20 parts of carbon black, 15 parts of magnesium oxide and 4 parts of a mixture of equal parts by weight of calcium oxide and benzyl trimethyl ammonium chloride were blended together and vulcanised.

The properties of the vulcanised rubber were as follows:

Physical properties after press cure at 160–170° C. for 45 minutes—

Ultimate tensile strength (p.s.i.) _____ 2000
Modulus at 100% elongation (p.s.i.) _____ 670
Elongation at break, percent _____ 230

Physical properties after press cure at 160–170° C. for 45 minutes plus oven cure as in Example 1—

Ultimate tensile strength (p.s.i.) _____ 2500
Modulus at 100% elongation (p.s.i.) _____ 1350
Elongation at break, percent _____ 190
Resistance to compression set:
  24 hours under compression at 160° C. _____ 17
  24 hours under compression at 250° C. _____ 74

A mixture of the same composition was also vulcanised by heating in a mould in a press for 45 minutes at 160–170° C., followed by an oven-cure for only 8 hours at 205° C. The cured rubber had the following properties:

Ultimate tensile strength (p.s.i.) _____ 2300
Modulus at 100% elongation (p.s.i.) _____ 1200
Elongation at break (percent) _____ 160
Resistance to compression set 24 hours under compression at 160° C. _____ 29

The test to evaluate the resistance of the cured composition to compression set is carried out according to the directions given in Method A of British Standard Specification No. 903 (Part A.6) 1963 and the figures given in the exmaples are obtained by following the procedure of the test of Method A referred to above.

Whilst the anions of the quaternary ammonium salts specified in the foregoing description are the chloride, bromide, phenoxide and penta-chloro-phenoxide it is to be understood that the invention is not limited to these anions but includes the use of quaternary ammonium salts containing a wide variety of other inorganic anions such as sulphate and nitrate and alkoxide and other anions may also be used.

We claim:
1. In the curing of the fluoro-rubber compositions by the action of heat upon a composition comprising a copolymer of vinylidene fluoride, carbon black and other fillers and a nitrogenous curing agent, the improvement which consists in the use of a bifunctional quaternary ammonium salt of the formula:

$$[R_3N-R^1-NR_3]^{++}2X^-$$

as the curing agent in which R represents an alkyl group and $R^1$ represents a bifunctional radical of the class consisting of alkylene and phenylene-dialkylene radicals and $X^-$ represents a monovalent anion, in an amount of from 1% to 4% by weight of the vinylidene fluoride copolymer as the curing agent.

2. In the curing of fluoro-rubber compositions by the action of heat upon a composition comprising a copolymer of vinylidene fluoride, carbon black and other fillers and a nitrogenous curing agent, the improvement which consists in the use of a trialkyl quaternary ammonium salt in an amount of from 1% to 4% by weight of the vinylidene fluoride copolymer as the curing agent, wherein the trialkyl quaternary ammonium salt is a monofunctional compound of the formula:

$$[R^{11}N-R_3]^+X^-$$

in which R represents an alkyl group and $R^{11}$ represents a monofunctional radical of the class consisting of alkyl and aralkyl radicals and $X^-$ represents a monovalent anion selected from the group consisting of a halide, an alkoxide, a phenoxide, a sulphate and a nitrate.

3. The method of curing a fluoro-rubber composition as claimed in claim 1 wherein the composition is given an initial cure by heating at a temperature in the range of 150° to 170° C.

4. The method claimed in claim 3 wherein the initially cured composition is further heated at a temperature in the range of 200° to 210° C.

5. The method claimed in claim 4 wherein the cured composition is given a post-cure heat treatment at a temperature up to 250° C.

6. The method of curing a fluoro-rubber composition as claimed in claim 1 wherein the curing agent is an alkylene bis trialkyl ammonium halide.

7. The method of curing a fluoro-rubber composition as claimed in claim 2 wherein the curing agent is an alkyl trialkyl ammonium halide.

8. The method of curing a fluoro-rubber composition as claimed in claim 1 wherein the curing agent is a phenylene-dialkylene bis trialkyl ammonium halide.

9. The method of curing a fluoro-rubber composition as claimed in claim 2 wherein the curing agent is a benzyl trialkyl ammonium halide.

References Cited

UNITED STATES PATENTS 3,243,411   3/1966   Tawney et al. _____ 260—87.7
3,309,376   3/1967   Haas et al. _____ 260—567.6

FOREIGN PATENTS 855,240   3/1959   Great Britain.

MORRIS LIEBMAN, *Primary Examiner.*

S. L. FOX, *Assistant Examiner.*